United States Patent [19]

Min

[11] Patent Number: 5,535,066

[45] Date of Patent: Jul. 9, 1996

[54] AUTOMATIC MONITORING METHOD FOR A VIDEO CASSETTE RECORDER

[75] Inventor: Byoung W. Min, Suwon, Rep. of Korea

[73] Assignee: Samsung Electronics Co., Ltd., Kyungki, Rep. of Korea

[21] Appl. No.: 144,037

[22] Filed: Nov. 1, 1993

[30] Foreign Application Priority Data

Nov. 27, 1992 [KR] Rep. of Korea .................. 92-22556

[51] Int. Cl.⁶ ............................................. G11B 27/36
[52] U.S. Cl. .......................... 360/31; 360/61; 360/74.1; 358/335
[58] Field of Search ..................... 360/69, 61, 74.1, 360/31; 358/335

[56] References Cited

U.S. PATENT DOCUMENTS 5,036,409  7/1991  Kaadem et al. .................. 360/61 X

FOREIGN PATENT DOCUMENTS 0444483  2/1992  Japan .

*Primary Examiner*—Andrew L. Sniezek
*Attorney, Agent, or Firm*—Sughrue, Mion, Zinn, Macpeak & Seas

[57] ABSTRACT

An automatic monitoring method for a video cassette recorder permits an automatic monitoring function to be added to a conventional data processing function provide by a VCR microcomputer. When the user selects an automatic monitoring function by a remote controller, automatic monitoring of a television broadcast is made possible during predetermined intervals under the control of the microcomputer during reproduction of a video cassette tape. Thus, the troublesome procedure of repeatedly manipulating a remote controller key is eliminated so that television broadcast monitoring can be carried out if the user forgets to press the key. The method includes steps for determining whether a video cassette tape within a deck section is being reproduced under the control of the microcomputer, determining whether an automatic monitoring function is turned on after recognizing reproduction of the video cassette tape, determining whether a reproduction period for the video cassette tape has elapsed after recognizing turning-on of the automatic monitoring function, and determining whether a television monitoring period has elapsed.

3 Claims, 2 Drawing Sheets

AUTOMATIC MONITORING METHOD FOR A VIDEO CASSETTE RECORDER

FIELD OF THE INVENTION

The present invention relates to an automatic monitoring method for a video cassette recorder (hereinafter VCR), in which an automatic monitoring method is added to the conventional data processing method using a microcomputer. More specifically, the automatic monitoring method according to the present invention permits a user to select an automatic monitoring function whereby an automatic television (hereinafter TV) monitoring function can be carried out at predetermined time intervals under the control of the microcomputer. Advantageously, the automatic monitoring method allows TV monitoring even during reproduction of a video cassette. Preferably, the automatic monitoring method according to the present invention is initiated using a remote controller.

Korean Patent Application No. 92-22556 is incorporated herein by reference for all purposes.

BACKGROUND OF THE INVENTION

Generally, when a VCR is watched, the TV monitoring method is carried out in such a manner that the TV pictures and VCR reproduction pictures can be alternatively selected only by repeatedly manipulating a monitor key in order to watch the desired TV pictures during VCR reproduction operation. Thus, the user is put to some trouble, i.e., continually pressing the key, when the viewing of both types of pictures is desired. Furthermore, if the user is engrossed in watching the VCR reproduction pictures, the user often forgets to monitor the TV pictures being broadcast, with the result that the desired TV pictures being broadcast are lost or are watched belatedly.

The present invention was motivated by a desire to overcome the problems with conventional VCRs.

SUMMARY OF THE INVENTION

The principal object of the present invention to provide an automatic monitoring method permitting alternative viewing of both TV pictures and VCR reproduced pictures.

One object of the present invention is to provide an automatic monitoring method for VCR in which an automatic monitoring function is added to the processing function controlled a microcomputer. Preferably, when the user selects an automatic monitoring function by means of a remote controller, a TV monitoring function advantageously can be automatically carried out at certain intervals under the control of the microcomputer during reproduction of a video cassette.

These and other objects, features and advantages of the present invention are provided by an automatic monitoring method for a VCR which permits VCR reproduction pictures and TV pictures to be selected under the control of the microcomputer in accordance with the control signals supplied from a remote controller. The automatic monitoring method includes the steps of:

determining whether the video cassette tape within the deck is being reproduced under the control of the microcomputer;

determining whether the automatic monitoring function has been turned on after recognizing the reproduction of the video cassette tape;

determining whether the reproduction period for the video cassette has elapsed when recognizing the turning-on of the automatic monitoring function; and determining whether the TV monitoring period has elapsed.

These and other objects, features and advantages of the invention are disclosed in or apparent from the following description of preferred embodiments.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
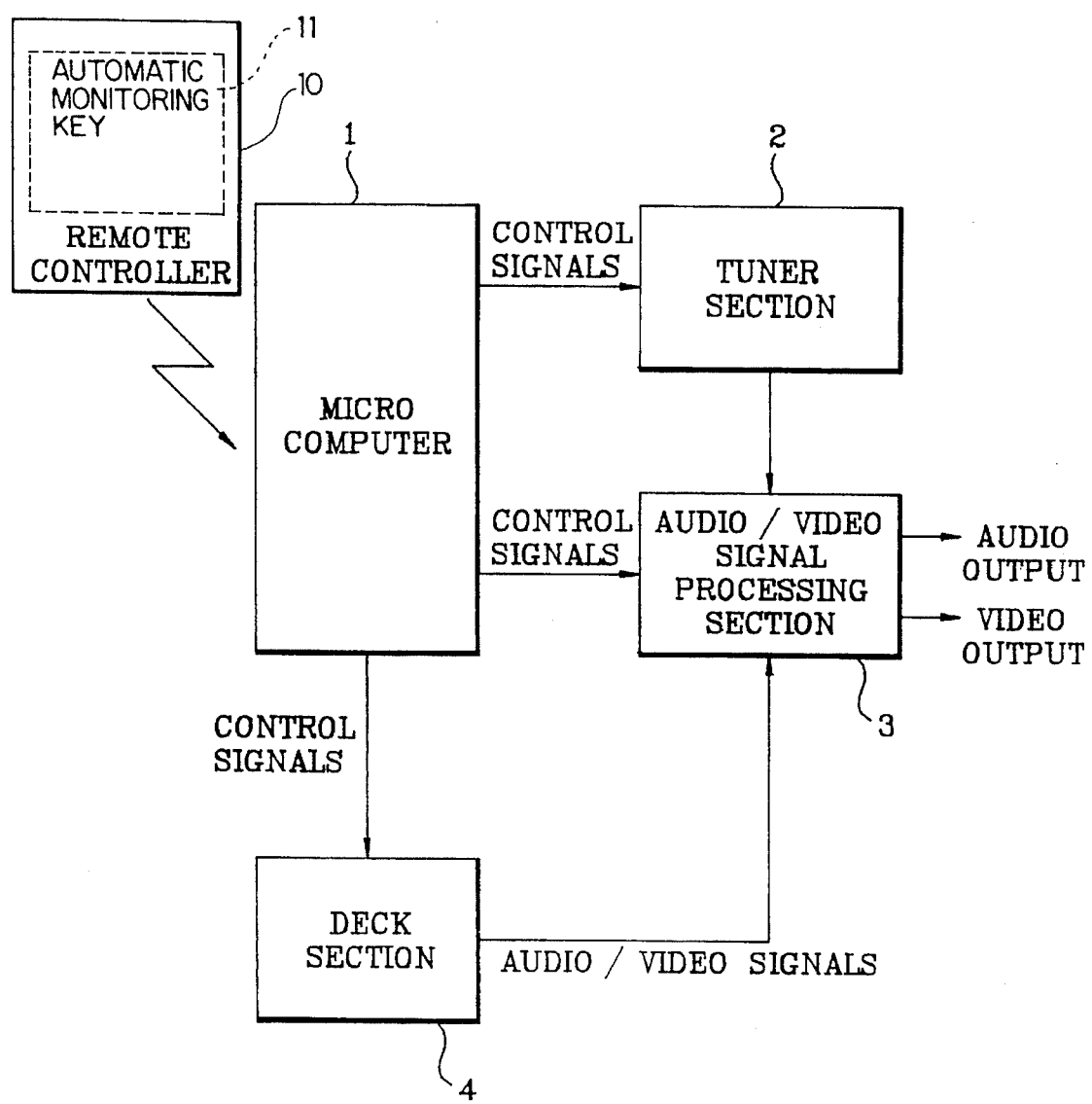
FIG. 1 is a block diagram showing the signal processing circuit suitable for carrying out an automatic monitoring method in a VCR according to the present invention.

A preferred embodiment according to the present invention will now be described while referring to FIG. 1, wherein a VCR implementing the inventive signal processing procedure includes:

a microcomputer 1 providing control signals for controlling respective internal sections of the VCR in accordance with external control signals received from a remote controller 10;

a tuner section 2 connected to the microcomputer 1 for tuning broadcast signals, e.g., audio and video broadcast signals, in accordance with the control signals from the microcomputer 1;

a deck section 4 connected to the microcomputer 1 for reproducing the audio and video signals recorded on the video cassette by activating the deck section 4 in accordance with control signals from the microcomputer 1; and an audio and video signal processing section 3 connected to the microcomputer 1, the tuner section 2 and the deck section 4, for processing tuned audio and video signals produced by the tuner section 2 and reproduced audio and video signals produced by the deck section 4 of the VCR in accordance with the control signals from the microcomputer 1, thereby providing the audio and video signals, separately.

The operation of the circuit just discussed for carrying out the inventive method according to the present invention will now be described.

When an automatic monitoring key 11 on the remote controller 10 is pressed, an external control signal indicative of an automatic monitoring function is input into the microcomputer 1. The microcomputer 1 receives the control signal and generates output control signals for controlling the tuner section 2, the deck section 4 and the audio and video signal processing section 3.

The deck section 4, which receives the control signals from the microcomputer 1, reproduces the audio and video signals which are recorded on the video cassette tape. Preferably, the reproduced audio and video signals are supplied to the audio and video signal processing section 3. The reproduced audio and video signals which are supplied to the audio and video signal processing section 3 are signal-processed and then output after being separated into audio and video signals.

Meanwhile, if a tape reproduction time which is set for the automatic monitoring elapses, the microcomputer 1 outputs control signals to the tuner section 2 and the deck section 4. The deck section 4 halts the reproducing operation for a short time upon receipt of the control signal from the microcomputer 1.

Furthermore, the tuner section 2, which advantageously has received the control signal from the microcomputer 1, tunes the TV broadcast signal so as permit monitoring of the TV broadcast signal during the time when the deck section 4 halts the reproducing operation. It will be noted that the audio and video signal processing section 3 processes the TV broadcast signals which have been tuned by the tuner section 2 to thereby provide separate audio and video signals.

Meanwhile, the microcomputer 1 generates time counting signals. When the video cassette tape is reproduced, the video cassette reproducing time of the deck section 4 is checked. Moreover, when the TV broadcast is monitored, the TV monitoring time of the tuner section 2 is checked. Thus, when the automatic monitoring function is selected, and when the video cassette tape is reproduced, the reproducing time for the video cassette is counted. When the counted time is equal to the set time, the system is switched over to the TV broadcast monitoring function. The TV broadcast monitoring time advantageously is counted as well. When the counted time equals to the set time, the system is switched back to the video cassette reproducing function under the control of microcomputer 1.

It should be noted that the time which is set for reproducing the video cassette tape, and the time which is set for the TV broadcast tuning, can be arbitrarily decided by the user.

Figure 2:
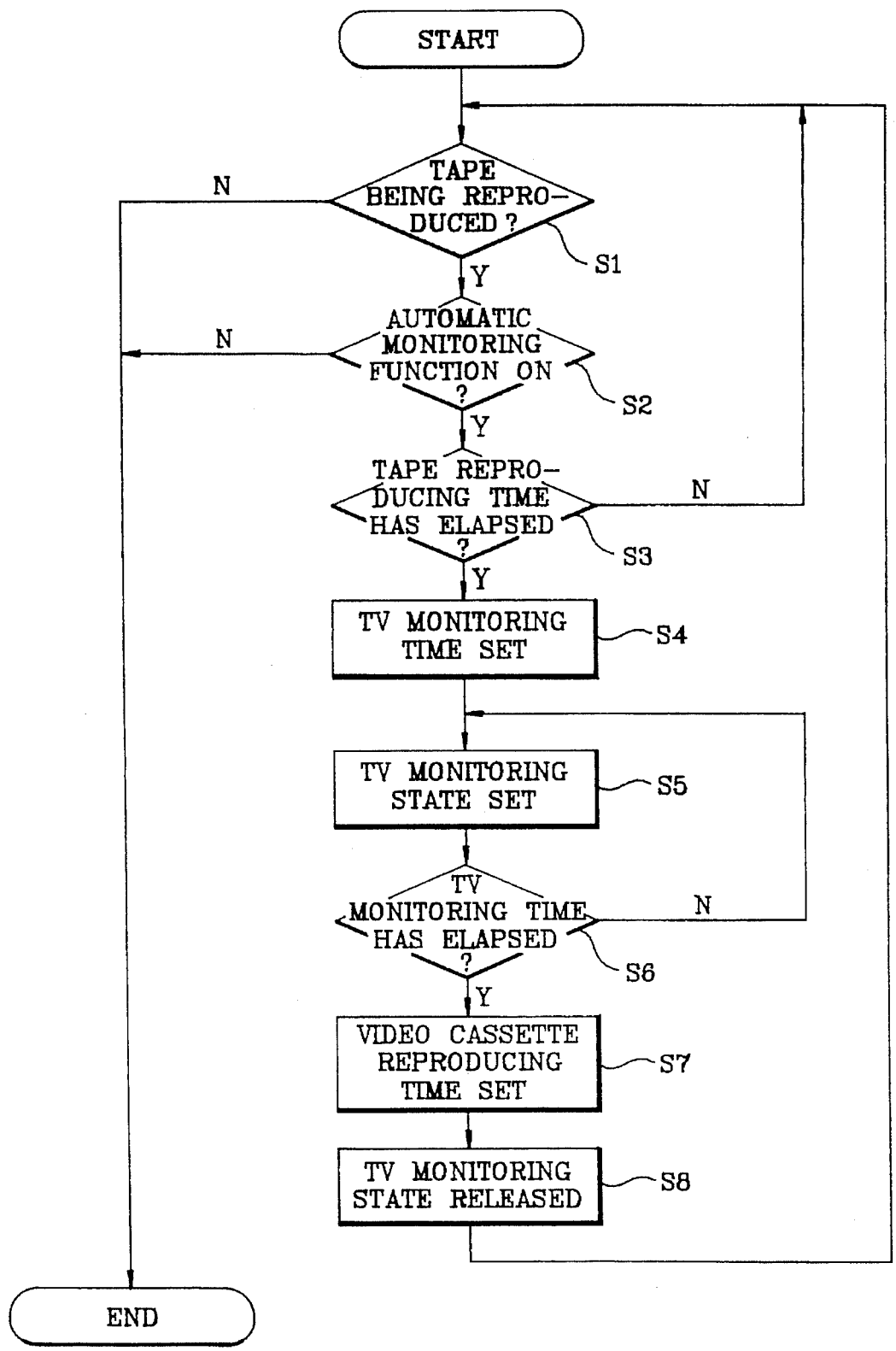
FIG. 2 is a flow chart showing the method for automatically monitoring VCR including the circuitry illustrated in FIG. 1 according to the present invention.

FIG. 2, is a flow chart showing the automatic monitoring method for a VCR suitable for implementation using the circuit of FIG. 1.

Referring to FIG. 2, if an automatic monitoring signal is generated from the remote controller 10 by pressing an automatic monitoring key 11, the microcomputer 1 receives the automatic monitoring signal, and thereafter decides whether the video cassette tape of the deck section 4 is being reproduced during step S1. If the video cassette tape is not being reproduced, the automatic monitoring function is terminated. On the other hand, if the video cassette is being reproduced, a decision is made as to whether the automatic monitoring function is ON or OFF during step S2. If the automatic monitoring function is OFF, the automatic monitoring function program is again terminated.

On the other hand, if the automatic monitoring function is ON, then a decision is made as to whether the video cassette reproducing time of the deck section 4 has passed the set time during step S3. If the reproducing time for the video cassette has not passed the set time, the system returns to step S1 and again decides whether the video cassette tape is being reproduced. On the other hand, if the reproducing time for the video cassette has passed the set time, then the system advances to a TV monitoring state setting step S5 after a TV monitoring time setting step S4 is carried out to permit the counting the TV monitoring time.

At the TV monitoring state setting step S5, TV monitoring is carried out during a predetermined time set. During step S6, the TV monitoring time is checked, and if the TV monitoring time has not passed the set time, the system returns to the TV monitoring state setting step S5 and continues TV broadcast monitoring. On the other hand, if the TV monitoring time has passed the set time, the system progresses to a video cassette reproducing time setting step S7 to set the video cassette reproducing time. At the same time, the TV monitoring state is released S8 and the system returns to the step S1, where it again decides whether the video cassette tape is being reproduced.

The above operating process according to the present invention may best be understood by considering an exemplary operation.

When the user wants to select an automatic monitoring function, the user has to set a video cassette reproducing time and a TV monitoring time. Here, it is assumed that the video cassette reproducing time is set to 10 minutes while the TV monitoring time is set to 10 seconds.

After setting the video cassette reproducing time and the TV monitoring time, when the user selects an automatic monitoring function by means of a remote controller, the microcomputer 1 decides whether the video cassette tape of the deck section 4 is being reproduced during step S1. If the video cassette tape is not being reproduced, the automatic monitoring function is terminated. On the other hand, if the video cassette tape is being reproduced, a decision is made as to whether the automatic monitoring function is on during step S2. After selection of the automatic monitoring function by the user, as long as the user does not cancel the automatic monitoring function, the automatic monitoring function remains as selected. Therefore, a decision is made as to whether the video cassette reproducing time has passed the set time during S3. That is, for the video cassette reproducing time of 10 minutes, the video cassette reproducing time is counted to determine whether the counted time has passed 10 minutes. If the counted time has not passed 10 minutes, the system repeats step S1, i.e., decides whether the video cassette tape is being reproduced.

On the other hand, if the counted time has passed 10 minutes, the TV monitoring time is set during step S4. As the user has set the TV monitoring time to 10 seconds, system is made ready to count 10 seconds. After being readied for counting, the system advances to a TV monitoring state setting step S5 to start TV monitoring.

As soon as the TV monitoring is started, a decision is made as to whether the time set for the TV monitoring, i.e., 10 seconds, has passed during step S6. If the TV monitoring time has not passed the set time, the system returns to the TV monitoring state setting step S5 so as to continue TV monitoring. On the other hand, if the TV monitoring time has passed the set time, the system advances to a video cassette reproducing time setting step S7 to set the video cassette reproducing time. During this step, as the user has set the video cassette reproducing time to 10 minutes, the system is made ready for counting 10 minutes. After being readied for counting, the TV monitoring state is released. Thereafter, the video cassette tape is reproduced. At the same time, the system returns to the step S1 to decide whether the video cassette is being reproduced, which results in the above process being repeated.

According to the present invention as described above, an automatic monitoring function is added to the conventional data processing function provide by a microcomputer controlling the deck and tuner of a VCR. Thus, if the user selects the automatic monitoring function by means of a remote controller, a TV monitoring function can be automatically carried out at certain time intervals under the control of the microcomputer even during the reproduction of the video cassette. Thus the troublesome procedure of repeatedly manipulating the key is eliminated. Moreover, TV broadcast monitoring can be performed even when the user forgets to operate the keys required to watch the TV broadcast.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An automatic monitoring method for video cassette recorder having a microcomputer capable of selecting a reproduction picture of a video cassette and a picture of television broadcasting in accordance with control signals of a remote controller, the method comprising the steps of:

selecting a reproduction picture of a video cassette tape to be reproduced;

determining when the video cassette tape within a deck section is being reproduced under the control of the microcomputer;

determining whether an automatic monitoring function is turned on after recognizing reproduction of the video cassette tape;

determining whether a reproduction period for the video cassette tape has elapsed after recognizing turning-on of the automatic monitoring function;

selecting a broadcast television picture; and after monitoring the broadcast television picture after elapse of said reproduction period, determining whether a television monitoring period has elapsed.

2. An automatic monitoring method for a video cassette recorder having a microcomputer capable of selecting one of a reproduced picture of a video cassette tape and a broadcast television picture in response to a control signal provided by a remote controller and controlling a tuner, a deck section and a signal processor, said method comprising the steps of:

selecting a reproduced picture of a video cassette tape;

when said video cassette tape is being reproduced and when an automatic monitoring mode of operation is established, determining whether a video cassette tape reproducing time has elapsed;

when said video cassette tape reproducing time has elapsed, stopping reproduction of said video cassette tape;

setting a television monitoring time;

initiating a television broadcast monitoring mode of operation;

determining whether said television monitoring time has elapsed;

setting said cassette tape reproducing time; and releasing the television monitoring mode of operation.

3. An automatic monitoring method for a video cassette recorder for alternatively producing a reproduced picture using a video cassette tape and a broadcast television picture using a tuner under control of a microcomputer responsive to a control signal provided by a remote controller and controlling a tuner, a deck section and a signal processor, said method comprising the steps of:

(a) when said video cassette tape is being reproduced and when an automatic monitoring mode of operation is established, determining whether a video cassette tape reproducing time has elapsed;

(b) when said cassette tape reproducing time has elapsed, stopping reproduction of said cassette tape;

(c) setting a television monitoring time;

(d) initiating a television broadcast monitoring mode of operation;

(e) determining whether said television monitoring time has elapsed;

(f) setting said cassette tape reproducing time;

(g) releasing the television monitoring mode of operation;

(h) re-initiating reproduction of said video cassette tape; and (i) repeating said steps (a) through (i).

* * * * *